Sept. 5, 1967  L. S. TAYLOR ET AL  3,339,413
LIQUID LEVEL GAUGE AND PROCESS OF MAKING SAME
Filed March 11, 1965  2 Sheets-Sheet 2

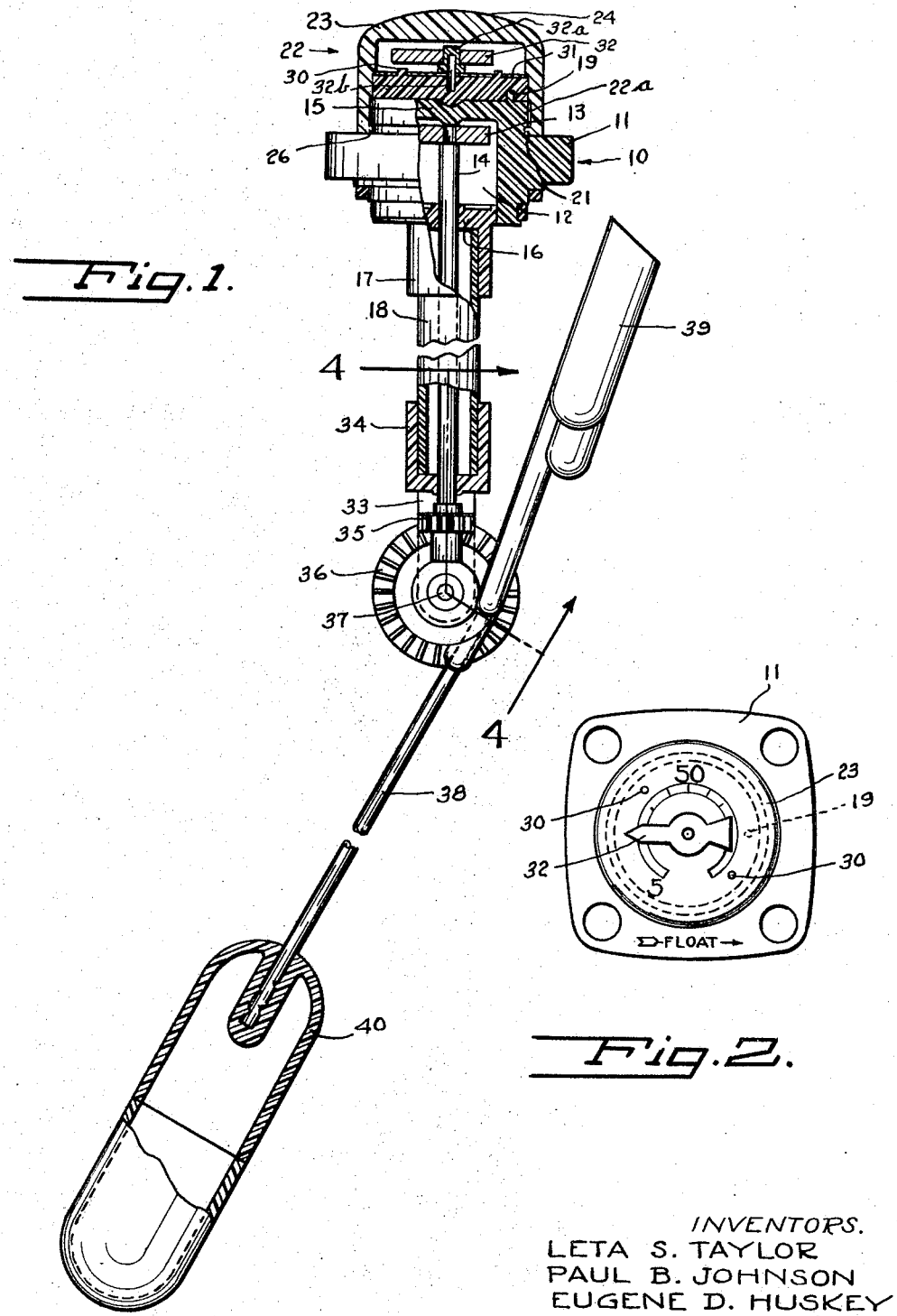

INVENTORS.
LETA S. TAYLOR
PAUL B. JOHNSON
EUGENE D. HUSKEY
BY
ATTORNEY.

United States Patent Office 3,339,413
Patented Sept. 5, 1967

3,339,413
LIQUID LEVEL GAUGE AND PROCESS
OF MAKING SAME
Leta S. Taylor, Paul B. Johnson, and Eugene D. Huskey, Garland, Tex., assignors to J. Y. Taylor Mfg. Company, a corporation of Texas
Filed Mar. 11, 1965, Ser. No. 439,023
6 Claims. (Cl. 73—317)

This invention relates to liquid level gages and has particular reference to a new and improved gage and process of making same, which gage is of the type adapted for use with storage tanks containing fluids or liquified gases stored under pressure such as butane and propane and which gage is of the leakproof, magnetic type.

An object of the invention is to provide a new and improved liquid level gage of the type set forth which is simpler and more economical in construction, yet efficient in operation.

Another object is to provide a new and improved gage of the type set forth which allows its use in a greater range of fluids without damage to the gage components than prior type gages.

Another object is to provide a gage of the type set forth wherein the visibility of the dial is improved thus facilitating the reading or viewing of the indication of the tank contents on the dial face.

Another object is to provide a gage having self contained indicating mechanism which may be adapted for removability and sealed to prevent entrance or accumulation of moisture or material foreign to the tank contents.

Another object is to provide a gage of the type set forth having an indicating head which allows the use of dials and dial plates which facilitate the reading of the indication on the dial.

Another object is to provide a new and improved indicator head for liquid level gages or the like.

Another object is to provide a new and improved gage wherein the indicator head is adapted for easy and quick connection to the gage head and yet is securely retained in operative position thereon.

Another object is to provide a new and improved gage head for a liquid level gage, which gage head is adapted for attachment to storage tanks and to withstand the internal pressures of gases in such tanks, and which gage head is relatively simple and economical in construction but will also resist oxidation while exposed to weather conditions.

Another object is to provide a new and improved liquid level gage which is formed of a material which will allow the assembly of components in such manner as by chemical means to thereby allow such components to become effectively integral.

Another object is to provide a liquid level gage wherein the parts normally subject to wear are made of a material which is wear resistant.

Another object is to provide a unitary float, counterweight and drive gear construction for liquid level gages.

Another object is to provide a new and improved process of making a liquid level gage of the type set forth which results in a relatively simple and economical, yet efficient, gage.

Another object is to provide a new and improved process of making an indicator head for a liquid level gage and for attaching said indicator head to the gage head.

Another object is to provide a new and improved process of making a unitary float, counterweight and drive gear unit for a liquid level gage.

Another object is to provide a new and improved process of assembling the components of a liquid level gage to obtain an effectively unitary construction.

Another object is to provide a new and improved liquid level gage and process of making same, wherein all of the components may be made of relatively inexpensive material which is capable of manufacture by molding or casting and which may be chemically united to form an effectively integral construction.

Other objects and advantages of the invention will be apparent from the following description taken in connection with the accompanying drawings wherein a preferred form of the invention is shown by way of illustration only.

Referring to the drawings:

FIG. 1 is a side view, partially in section, of a liquid level gage constructed according to the invention;

FIG. 2 is a top or plan view of the gage head and indicator head of the gage shown in FIG. 1;

Figure 3:
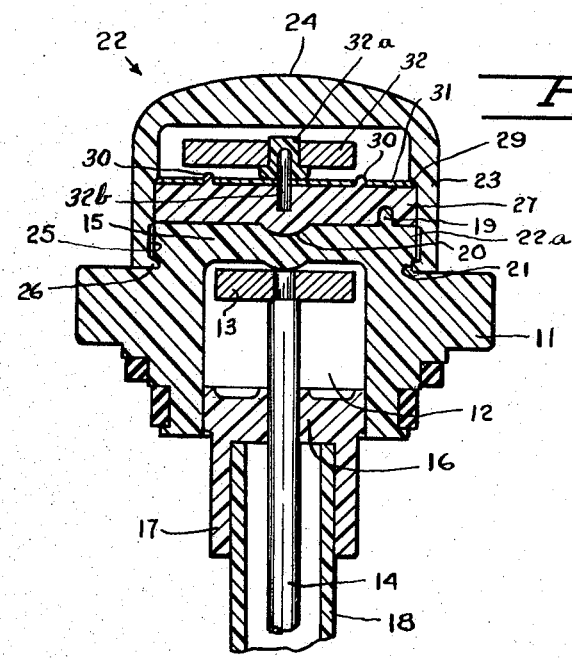
FIG. 3 is a fragmentary, sectional view, on a larger scale, of the gage shown in FIGS. 1 and 2.
Figure 4:
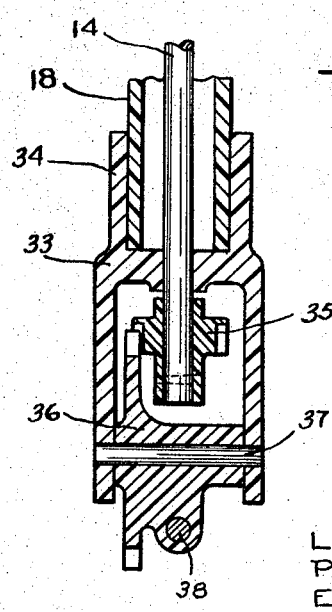
FIG. 4 is a sectional view taken on line 4—4 of FIG. 1 looking in the direction of the arrows.

Referring more particularly to the drawings wherein similar reference characters designate corresponding parts throughout the several views, the device shown formed according to the invention comprises a gage head designated generally at 10, having the rim 11 through which are provided openings for bolts or other suitable fastening means for securing the gage head 10 in operative position over an opening in the storage tank. Gage head 10 may be cast or molded of suitable plastic material as hereinafter set forth or die cast of aluminum or zinc depending upon the use intended.

Gage head 10 is provided with chamber 12 for drive magnet 13 which is rigidly secured on the upper end of rotatably mounted shaft 14, whereby pivotal movement or rotation of shaft 14 effects simultaneous rotation or pivotal movement of drive magnet 13.

The upper end of gage head 10 is closed or sealed by wall 15 which is formed integral with gage head 10.

The lower side of chamber 12 is closed by the wall of connector 16 which is formed with integral tubular connector portion 17 depending therefrom to which is secured the upper end of tubular riser 18 which is in telescoping relation with connector portion 17 and secured thereto by bonding or staking.

Connector 16 with tubular portion 17 is molded or cast of chemical resistant plastic.

The locating lug 19 is provided on the upper surface of wall 15 which is also provided with a central recess 20 and peripheral groove 21 which is formed beneath peripheral flange 22a.

The indicator head designated generally at 22 comprises cup-shaped gage head crystal 23 which is molded or cast of clear, colorless, transparent plastic or other material such as glass, and may include a portion having curved surface contours 24 of such curvature as to provide desired magnification in such portion 24 to facilitate the reading or viewing of the indications on the dial.

Gage head crystal 23 is provided with the peripheral groove 25 adapted to fit over peripheral flange 22a and may be secured thereto by suitable adhesive with rim or lug 26 positioned in peripheral groove 21 whereby the entrance of moisture or dust or the like into indicator head 22 is prevented.

Within indicator head 22 is provided dial support plate 27 which has rcesses in its lower surface for receiving locating lugs 19 to properly orient indicator head 22 on gage head 10 and said dial support plate 27 also may have a central offset portion adapted to be positioned in recess 20 in the upper surface of wall 15.

Dial support plate 27 is preferably made by molding or casting of suitable plastic or other material and secured in desired position in indicator read 22 against flange 29 by suitable bonding material or adhesive.

To locate the indicator head in desired or predetermined position on the gage head there are provided on the upper surface of dial support plate 27, the locating lugs 30 adapted to be positioned in corresponding openings in dial face 31 which may be formed of suitable metal such as aluminum or of other desired material such as molded or cast plastic and this dial face is provided with suitable indicia thereon whereby magnetic pointer 32 indicates on such dial face 31 the contents of the storage tank. Pointer 32 is carried by pointer hub 32a which in turn is mounted for pivotal movement on pivot 32b which is carried by dial support plate 27.

The gage head 10 is formed by casting or molding of suitable plastic material or die cast of aluminum, zinc or other material depending upon the use to be made of the gage.

Indicator head 22, including crystal 23, dial support plate 27, dial face 31, pointer 32, pointer pin 32b and hub 32a are assembled to form a single self-contained and sealed indicator head which is pressed on to the gage head and secured thereto by engagement of the rim or lug on the indicator head into the retaining groove in the gage head.

The cast or molded plastic fork 33 has the tubular portion 34 adapted to receive the end of riser 18 and be secured thereto by staking or bonding by suitable chemical dependent upon the plastic material of which the fork 33 and riser 18 are constructed.

Shaft 14 has its end portion extending through an opening in the wall of fork 33 and on the end of said shaft 14 is positioned driven gear 35 which is formed of cast or molded plastic and either pinned to the drive shaft 14 or formed thereon in the case of a metal drive shaft or formed integral therewith in the case of a plastic drive shaft. The driven gear 35 is preferably formed of wear resistant material such as nylon.

The drive gear 36 is pivotally mounted on pivot 37 in fork 33. This drive gear 36 is preferably formed of wear resistant material such as nylon and meshes with driven gear 35 to thereby pivot drive shaft 14. Float rod 38 and counterweight 39 may be a metal rod cast or molded to gear 36 which rod can be plastic coated to render them more resistant to chemical reaction, or they can be of plastic and cast or molded integral with drive gear 36.

Float 40 is of chemical resistant plastic and can be secured to float rod 38 where such rod is of metal and can be cast or molded thereon or molded integral therewith when said rod 38 is made of plastic.

Counterweight 39 can be made of desired weight by controlling the size or material of which it is constructed or it can be formed of plastic coated metal. It is preferable that the unitary drive gear, counterweight, float arm and float be molded or cast as stated above to simplify and reduce the cost of manufacture thereof.

In the manufacture of the liquid level gage of this invention, the gage head 10 may be formed of die cast metal such as aluminum or zinc or molded or cast of a plastic having sufficient strength such as nylon or an acrylonitrile-butadiene-styrene composition which is relatively stable, tough, hard and rigid and withstands acids and pressure and resists weather.

Other plastics which might be employed depending upon the material with which the gage is to be used are polycarbonates, polystyrenes, acrylics, vinyls or others with suitable properties.

Other parts, such as the indicator head, connector riser, fork, drive rod, and drive gears may also be formed of such plastic materials.

Drive magnet and the end of shaft 14 are then placed in chamber 12 in gage head 10 with shaft 14 extending through the opening in the wall of connector 16 to which connector 16 and the end of riser 18 is secured as stated above.

Connector 16 is connected to gage head 10 by bonding or by suitable adhesive.

Fork 33 is then secured on the end of riser 18 by staking or by bonding or by suitable adhesive to connect tubular portion 34 of fork 33 to the end of riser 18, with shaft 14 extending therethrough.

The unit consisting of drive gear 36, float rod 38, float 40 and counterweight 39 is then mounted on fork 33 by pivot pin 37 with gears 35 and 36 in meshing relation.

Where gear 35 is formed integral with shaft 14 it will be necessary to mount fork 33, riser 18 and connector 16 together as a unit before mounting drive magnet 13 on shaft 14 and then connecting this assembly to gage head 10 as previously described.

The indicator head, which is formed as a unit, as described above is mounted on the upper side of gage head 10 to complete the assembly.

As shown in the drawings, a suitable gasket is provided between the gage head 10 and the storage tank to seal this connection.

From the foregoing it will be seen that we have provided new and improved means and process for obtaining all of the objects and advantages of the invention.

We claim:

1. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet said dial member comprising a member of cast, non-magnetic material carried by said indicator head intermediate said dial viewing portion and said rim portion, and cooperative locating means on said gage head and said indicator head for locating said indicator head in predetermined position on said gage head.

2. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet said dial member comprising a member of cast, non-magnetic material carried by said indicator head intermediate said dial viewing portion and said rim portion, said gage head and said indicator head being both of cast, non-metallic material.

3. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet, said dial member comprising a member of cast, non-metallic material carried by said indicator head intermediate said dial viewing portion and said rim portion.

4. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet, said dial member comprising a member of cast, non-metallic material carried by said indicator head intermediate said dial viewing portion and said rim portion, and a non-metalIc rod connecting said float and said drive magnet.

5. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet said dial member comprising a member of cast, non-magnetic material carried by said indicator head intermediate said dial viewing portion and said rim portion, said dial viewing portion having surface curvatures such as to magnify the image of said dial and indicator seen therethrough.

6. In a liquid level gage, a gage head formed of cast, non-magnetic material, said gage head being adapted to be positioned over an opening in a storage tank for indicating the quantity of material in said storage tank, said gage head having a peripheral portion whereby said gage head may be operatively connected in operative position to said storage tank, a drive magnet in said gage head, a float member carried by said gage head and adapted to be positioned in said storage tank, means operatively connecting said float member to said drive magnet for actuating said drive magnet according to the quantity of contents in said storage tank, and an indicator head positioned over said gage head, said indicator head including a cup-shaped crystal having a rim portion engaging the upper portion of said gage head and connected thereto to connect said crystal to said gage head, said crystal having an integral transparent dial viewing portion, a dial member carried by said crystal in alignment with said transparent dial viewing portion, and an indicator mounted for pivotal movement relative to said dial member and adapted to be actuated by said drive magnet, said dial member comprising a member of cast, non-metallic material carried by said indicator head intermediate said dial viewing portion and said rim portion, said float member comprsing a non-metallic float and non-metallic float drive gear operatively connected together and a non-metallic driven gear on said rod meshing with said float drive gear, a cast, non-metallic connector connected to said gage head, a cast, non-metallic fork supporting said drive gear and a non-metallic tubular riser connecting said connector and work.

References Cited

UNITED STATES PATENTS

| | | | |
|---|---|---|---|
| 1,338,745 | 5/1920 | Maloney | 58—127.5 |
| 1,937,231 | 11/1933 | Klein | 73—317 X |
| 2,206,437 | 7/1940 | Tracy. | |
| 2,358,472 | 9/1944 | Owens | 73—322.5 |
| 2,570,539 | 10/1951 | Fowler | 58—127.5 |
| 2,578,104 | 12/1951 | Taylor | 73—37 |
| 2,584,446 | 2/1952 | Hastings et al. | 73—317 |
| 2,630,715 | 3/1953 | Hall et al. | 73—317 |
| 2,992,560 | 7/1961 | Morgan et al. | 73—317 |
| 3,143,885 | 8/1964 | Waite et al. | 73—431 |
| 3,152,480 | 10/1964 | Hoff | 73—431 |

OTHER REFERENCES

Publication: "Nylon in Bearings & Gears" by William C. Wall, Product Engineering, July 1950. Pages 102–107, 28–IN, Nylon Digest.

LOUIS R. PRINCE, *Primary Examiner.*

D. M. YASICH, *Assistant Examiner.*